United States Patent
Zaki et al.

(10) Patent No.: US 11,601,437 B2
(45) Date of Patent: *Mar. 7, 2023

(54) ACCOUNT ACCESS SECURITY USING A DISTRIBUTED LEDGER AND/OR A DISTRIBUTED FILE SYSTEM

(71) Applicant: Capital One Services, LLC, McLean, VA (US)

(72) Inventors: Zainab Zaki, Reston, VA (US); Jeffrey Brown, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/301,469

(22) Filed: Apr. 5, 2021

(65) Prior Publication Data

US 2021/0234867 A1  Jul. 29, 2021

Related U.S. Application Data

(63) Continuation of application No. 16/776,127, filed on Jan. 29, 2020, now Pat. No. 10,972,475.

(51) Int. Cl.
*H04L 9/40* (2022.01)
*G06N 20/00* (2019.01)
(Continued)

(52) U.S. Cl.
CPC ........... *H04L 63/105* (2013.01); *G06F 16/28* (2019.01); *G06F 21/316* (2013.01); *G06N 5/04* (2013.01);
(Continued)

(58) Field of Classification Search
None
See application file for complete search history.

(56) References Cited

U.S. PATENT DOCUMENTS 9,514,293 B1 * 12/2016 Moritz .................. H04L 67/143
9,882,918 B1 *  1/2018 Ford .................... H04L 67/306
(Continued)

OTHER PUBLICATIONS

Kouzinopoulos CS, et al. Implementing a forms of consent smart contract on an IoT-based blockchain to promote user trust. In2018 Innovations in Intelligent Systems and Applications (INISTA) Jul. 3, 2018 (Year: 2018).*

(Continued)

*Primary Examiner* — James R Turchen
(74) *Attorney, Agent, or Firm* — Harrity & Harrity, LLP

(57) ABSTRACT

A node of a network receives account access information (AAI) for an account that a user has with a system. The node causes a first record to be added to a distributed ledger that is used for managing access to the account, wherein the first record includes the AAI or an encrypted storage identifier that identifies a storage location for the AAI. The node determines a likelihood that the account is being accessed by the user based on the AAI and/or historical AAI for one or more accounts, that include the account, that are used to access the system. The node causes a second record that includes a value representing the likelihood to be added to the distributed ledger. The node causes one or more other nodes of the network to be alerted that the first record and the second record have been added to the distributed ledger.

20 Claims, 10 Drawing Sheets

100

105
A network of nodes may access a distributed ledger that is used to manage access to accounts

(51) Int. Cl.
  *G06N 5/04*   (2023.01)
  *G06F 16/28*  (2019.01)
  *G06F 21/31*  (2013.01)
  *H04L 9/00*   (2022.01)

(52) U.S. Cl.
  CPC ........... *G06N 20/00* (2019.01); *H04L 63/083* (2013.01); *H04L 63/0861* (2013.01); *H04L 63/107* (2013.01); *H04L 63/1425* (2013.01); *H04L 9/50* (2022.05)

(56) References Cited

U.S. PATENT DOCUMENTS

| | | | | |
|---|---|---|---|---|
| 10,476,879 | B2* | 11/2019 | Bathen | H04L 9/30 |
| 10,645,096 | B2* | 5/2020 | Ford | H04L 63/1433 |
| 10,972,475 | B1 | 4/2021 | Zaki et al. | |
| 2016/0300252 | A1* | 10/2016 | Frank | G06Q 30/0203 |
| 2017/0279801 | A1* | 9/2017 | Andrade | G06F 21/30 |
| 2017/0353311 | A1* | 12/2017 | Schukai | H04L 9/0618 |
| 2017/0366348 | A1* | 12/2017 | Weimer | H04L 9/3247 |
| 2018/0285767 | A1* | 10/2018 | Chew | H04L 67/566 |
| 2018/0294966 | A1* | 10/2018 | Hyun | H04L 9/3226 |
| 2018/0332063 | A1* | 11/2018 | Ford | H04L 67/535 |
| 2019/0012249 | A1* | 1/2019 | Mercuri | G06F 9/542 |
| 2019/0044942 | A1* | 2/2019 | Gordon | G06K 9/00536 |
| 2019/0068367 | A1* | 2/2019 | Baughman | G06F 21/32 |
| 2019/0124118 | A1* | 4/2019 | Swafford | H04L 63/1408 |
| 2019/0236598 | A1* | 8/2019 | Padmanabhan | G06Q 20/0655 |
| 2019/0287026 | A1* | 9/2019 | Calmon | G06N 20/00 |
| 2019/0289013 | A1* | 9/2019 | Makmel | H04L 63/0876 |
| 2019/0386975 | A1* | 12/2019 | Li | G06F 21/64 |
| 2019/0392064 | A1* | 12/2019 | Swope | G06F 16/2365 |
| 2020/0004995 | A1* | 1/2020 | Kawaguchi | H04L 9/088 |
| 2020/0014528 | A1* | 1/2020 | Nandakumar | H04L 9/3239 |
| 2020/0036515 | A1* | 1/2020 | Chari | H04L 9/3239 |
| 2020/0119922 | A1* | 4/2020 | Bingham | G06F 21/36 |
| 2020/0134143 | A1* | 4/2020 | Deole | G06Q 20/4014 |
| 2021/0336956 | A1* | 10/2021 | Bitauld | H04L 9/3239 |

OTHER PUBLICATIONS

Guo H, Meamari E, Shen CC. Multi-authority attribute-based access control with smart contract. InProceedings of the 2019 international conference on blockchain technology Mar. 15, 2019 (pp. 6-11). (Year: 2019).*

Cruz JP, Kaji Y, Yanai N. RBAC-SC: Role-based access control using smart contract, Ieee Access. Mar. 7, 2018;6:12240-51. (Year: 2018).*

Bergsten, E. and Jiang, O., Authentication Using Smart Contracts in a Blockchain (Master's thesis). (Year: 2018).

* cited by examiner

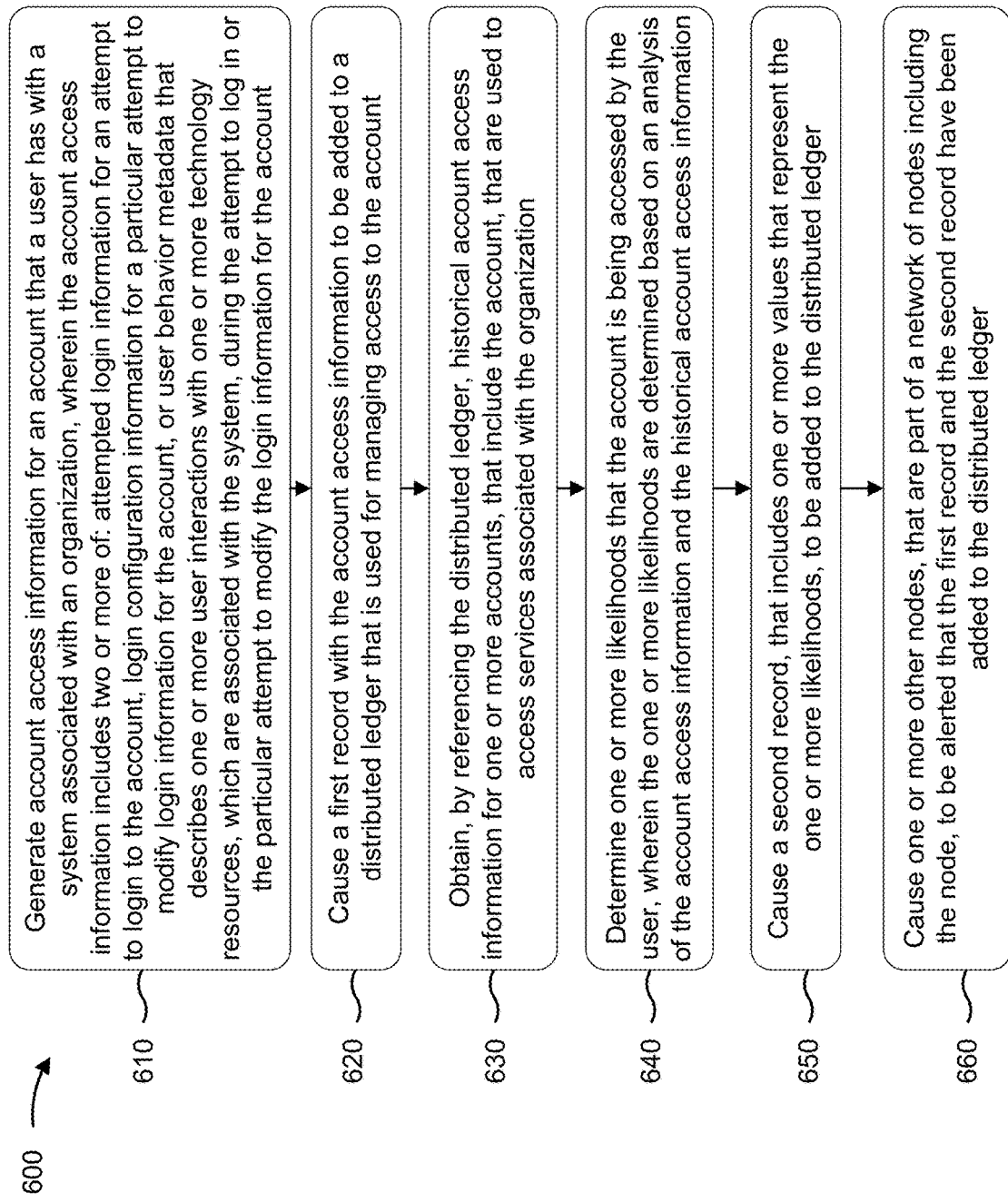

ACCOUNT ACCESS SECURITY USING A DISTRIBUTED LEDGER AND/OR A DISTRIBUTED FILE SYSTEM

RELATED APPLICATION

This application is a continuation of U.S. patent application Ser. No. 16/776,127, filed Jan. 29, 2020 (now U.S. Pat. No. 10,972,475), which is incorporated herein by reference in its entirety.

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some implementations described herein, a method may include receiving account access information for an account that a user has with an organization. The account access information may include: attempted login information for one or more attempts to login to the account, or login configuration information for a particular attempt to modify login information of the account. The method may include causing a first record to be added to a distributed ledger that is used for managing access to the account. The first record may include the account access information, or an encrypted identifier that identifies a storage location at which the account access information is to be stored. The method may include determining a likelihood that the account is being accessed by the user. The likelihood may be determined based on at least one of: the account access information, or historical account access information for one or more accounts, that include the account, that are used to access one or more services associated with the organization. The method may include causing a second record that includes a value representing the likelihood to be added to the distributed ledger. The method may include causing one or more other nodes of the network to be alerted that the first record and the second record have been added to the distributed ledger.

According to some implementations, a node may include one or more memories, and one or more processors, operatively coupled to the one or more memories, configured to receive account access information for an account that a user has with an organization. The account access information may include at least one of: attempted login information for an attempt to login to the account, login configuration information for a particular attempt to modify login information of the account, or user behavior metadata that describes one or more user interactions with one or more technology resources, that are associated with a system of the organization, during the attempt to login or the particular attempt to modify the login information of the account. The one or more processors may cause a first block to be added to a blockchain that is used for managing access to the account. The first block may include the account access information or an encrypted identifier that identifies a storage location at which the account access information is to be stored. The one or more processors may determine a likelihood that the account is being accessed by the user. The likelihood may be determined based on an analysis of the account access information and historical account access information for one or more accounts, that include the account, that are used to access one or more services associated with the organization. The one or more processors may cause a second block that includes a value representing the likelihood to be added to the blockchain to permit one or more other nodes, that are part of a network with the node, to access the first block and the second block via the blockchain.

According to some implementations, a non-transitory computer-readable medium may store one or more instructions. The one or more instructions, when executed by one or more processors of a node, may cause the one or more processors to generate account access information for an account that a user has with a system associated with the organization. The account access information may include two or more of: attempted login information for an attempt to login to the account, login configuration information for a particular attempt to modify login information of the account, or user behavior metadata that describes one or more user interactions with the one or more technology resources, which are associated with the system, during the attempt to login or the particular attempt to modify the login information of the account. The one or more instructions may cause the one or more processors to cause a first record with the account access information to be added to a distributed ledger that is used for managing access to the account. The one or more instructions may cause the one or more processors to obtain, by referencing the distributed ledger, historical account access information for one or more accounts, that include the account, that are used to access services associated with the organization. The one or more instructions may cause the one or more processors to determine one or more likelihoods that the account is being accessed by the user. The one or more likelihoods may be determined based on an analysis of the account access information and the historical account access information. The one or more instructions may cause the one or more processors to cause a second record, that includes one or more values representing the one or more likelihoods, to be added to the distributed ledger. The one or more instructions may cause the one or more processors to cause one or more other nodes, that are part of a network of nodes including the node, to be alerted that the first record and the second record have been added to the distributed ledger.

BRIEF DESCRIPTION OF THE DRAWINGS

FIGS. 4-6 are flow charts of example processes for using a distributed ledger to determine a likelihood that a user accessing an account is an authorized user and for performing one or more actions based on the likelihood that the user is the authorized user.

DETAILED DESCRIPTION

Figure 1A:
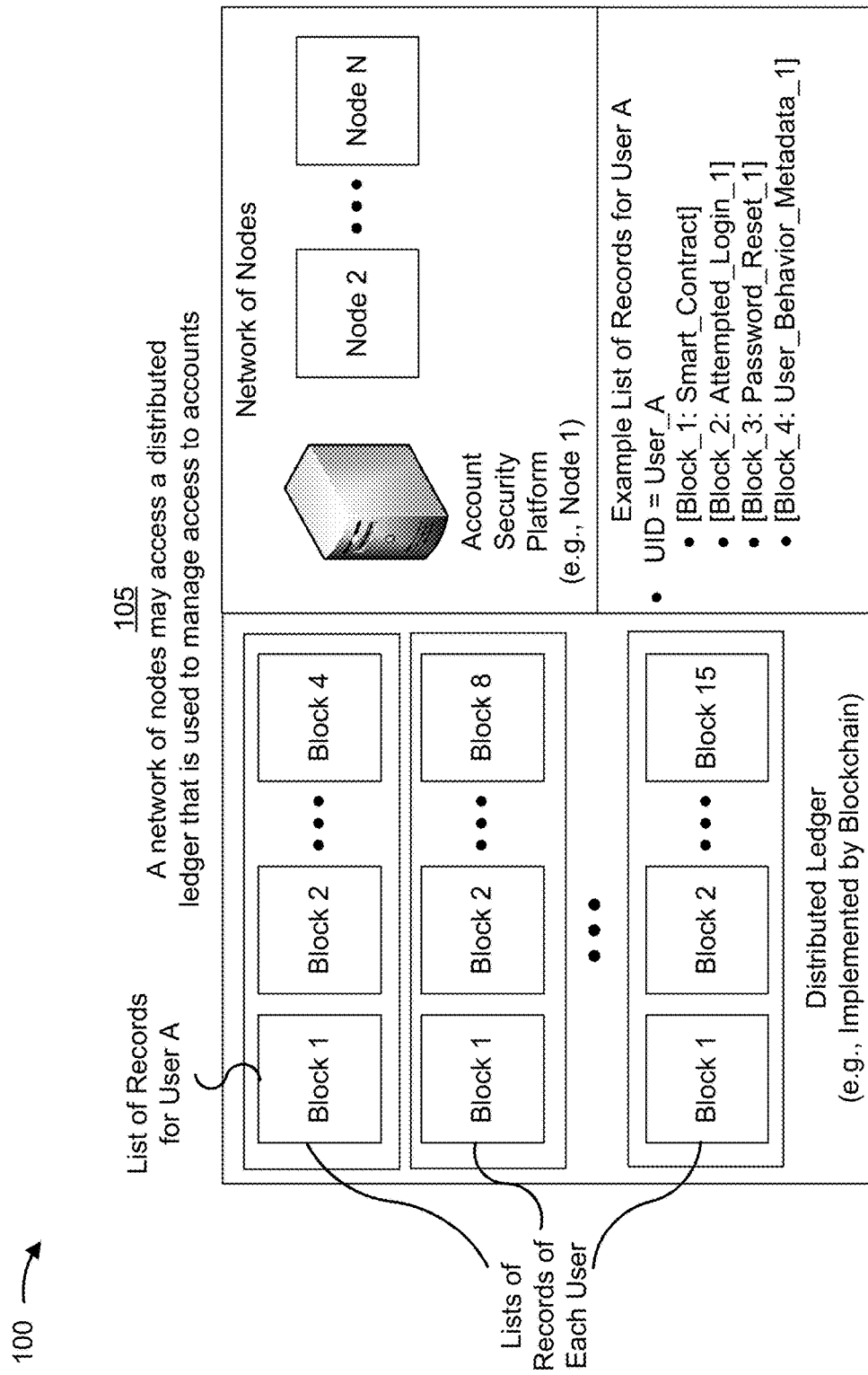
FIGS. 1A-1E are diagrams of one or more example implementations described herein.

The following detailed description of example implementations refers to the accompanying drawings. The same reference numbers in different drawings may identify the same or similar elements.

Identity and access management (IAM) is a framework of policies and technologies for ensuring that only authorized users have access to technology resources, such as particular hardware devices, particular software tools, and/or the like. An organization may utilize an IAM system to identify, authenticate, and/or authorize user access of technology resources of an organization.

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. Additionally, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. Further, the distributed ledger may correspond to a record of consensus with a cryptographic audit trail that is maintained and validated by a set of independent computers.

In some cases, the blockchain may be used to store information that may be used to identify, authenticate, and/or authorize user access to an account. However, storing this information via a secure data structure may be ineffective if an insufficient amount of information is collected and used to identify, authenticate, and/or authorize the user attempting to access the account. For example, using a blockchain to store login information (e.g., a username, a password) that has been input by a user during a login procedure may create a verifiable list of records of login attempts to the account, but may be unable to serve as a verifiable list of records which verify that the user that attempted to login is in fact the authorized user. Furthermore, if a user leaves a computer and remains logged into the account, there is not an efficient and/or effective way to use a blockchain to store a verifiable list of records which could verify that the user accessing one or more services of the account is in fact the authorized user.

Some implementations described herein provide an account security platform, which is a first node of a network of nodes that have access to a distributed ledger, to determine a likelihood that a user accessing an account is an authorized user and to perform one or more actions based on the likelihood that the user is the authorized user. For example, the user may interact with a second node, of the network of nodes, to attempt to login to the account, to attempt to modify login information of the account, and/or to attempt to access one or more services associated with the account. This may cause the second node to provide the account security platform with account access information that includes attempted login information for the attempt to access the account, login configuration information for the attempt to modify the login information of the account, user behavior metadata that describes one or more user interactions with one or more technology resources (e.g., while attempting to login to the account, while attempting to modify the login information, while attempting to use a service associated with the account), and/or the like.

Furthermore, the account security platform may cause a first record to be added to a distributed ledger that is used to manage access to the account. The first record may include the account access information or an encrypted identifier that identifies a storage location at which the account access information is to be stored. Additionally, the account security platform may process the account access information, historical account access information associated with the account (and/or other accounts), the user preferences information of the authorized user, and/or the like, to determine an account security score that represents a likelihood that the account is being accessed by the authorized user. The account security score may be determined using one or more smart contracts and/or a data model that has been trained using machine learning. This may allow the account security platform to cause a second record, that includes the account security score, to be added to the distributed ledger, which may permit one or more other nodes, of the network of nodes, to access the first record and the second record via the distributed ledger.

In this way, the account security platform uses the distributed ledger to monitor, verify, and/or manage access to the account of the authorized user. Additionally, the account security platform facilitates the distribution of account access information in a manner that is flexible, secure, and distributed. For example, flexibility may be provided by enabling execution of various smart contracts that are able to process different types of account access information that may be processed to verify whether the user is the authorized user.

Furthermore, security is provided by supporting the distributed ledger with a tamper-resistant data structure (e.g., a distributed ledger, such as a blockchain), by implementing various forms of authentication, and/or the like. For example, the distributed ledger may improve security by preserving an immutable record of account access information, by using cryptographic links between records of the distributed ledger (e.g., reducing the potential for unauthorized tampering with the account access information), and/or the like. Security is further improved as a result of devices that have access to the distributed ledger independently verifying each record that is added to the distributed ledger. Moreover, use of the distributed ledger also provides failover protection, in that the account security platform may continue to operate in a situation where one or more other nodes that have access to the distributed ledger fail (and the one or more other nodes may continue to operate in a situation where the account security platform fails). Additionally, by identifying unauthorized access to the account, further unauthorized account access may be blocked, thereby conserving resources that would otherwise be wasted if the unauthorized user continued to access the account.

FIGS. 1A-1E are diagrams of one or more example implementations 100 described herein. The one or more example implementations 100 may include a network of nodes (shown as node 1 through node N, where node 1 is an account security platform) that support and/or have access to a distributed ledger, a device associated with a security administrator (shown in FIG. 1E as a Security Administrator Device), a fraud detection server (see FIG. 1E), and a device associated with an auditor (shown in FIG. 1E as an auditor device).

As shown in FIGS. 1A-1E, the account security platform may determine a likelihood that a user accessing an account is an authorized user of the account and may perform one or more actions based on the likelihood that the user is the authorized user. Some implementation descriptions herein may describe the account security platform as a master node or a management node of the network of nodes. It is to be understood that this is provided by way of example, and that in practice, any implementation performed by the account security platform may be performed by one or more other nodes (e.g., with another node serving as the master node, with the network of nodes operating without a master node, and/or the like).

As shown in FIG. 1A, and by reference number 105, the network of nodes may have access to a distributed ledger that is used to manage access to a set of accounts. The set of accounts may be used to provide a group of users with access to a set of services associated with an organization (e.g., a financial institution, a bank, and/or another type of organization). For example, a particular user may be an employee or an agent of the organization and may have one or more accounts that are used to access the set of services. The set of services may include software applications (e.g., a web application, a mobile application, a desktop application, and/or the like) that the group of users may utilize to complete various tasks for the organization. Furthermore, while one or more implementations described herein relate to a single organization, it is to be understood that this is provided by way of example. In practice, the distributed ledger may be shared between multiple organizations (e.g., multiple financial institutions, multiple banks, and/or the like).

In some implementations, the distributed ledger may be implemented by a tamper-resistant data structure, such as a blockchain. The blockchain may include a federated blockchain, a permission-based blockchain, a distributed blockchain, a private blockchain, a hybrid blockchain, and/or the like. The blockchain may include a continuously-growing list of records, called blocks, that may be linked together to form a chain. In some cases, each block in the blockchain may include a timestamp and a link to a previous block. The blocks may be secured from tampering and revision. For example, the blocks in the blockchain may be encrypted using public keys, such that accessing a block would require using a private key to decrypt the block. Additionally, in some cases, the distributed ledger may correspond to a record of consensus with a cryptographic audit trail that is maintained and validated by a set of independent computers. This means that if a user adds a new block to the blockchain, each permitted user may have to independently update a separate copy of the blockchain and may have to independently verify that the separate copy of the blockchain matches the blockchain that has been modified to include the new block.

In some implementations, the distributed ledger may be used to store account access information for the group of users. For example, over time, users may login to access the set of services. This may cause the distributed ledger to be used to store a verifiable list of records that describe an attempt that a particular user (the authorized user or an unauthorized user) made to access an account linked to an authorized user, an attempt that a particular user made to modify login information needed to login to the account, and/or the like. Additional information regarding account access information is provided in connection with FIG. 1B.

In the example shown, a blockchain may store a list of records associated with an account of a first user (shown as User A). In this example, the blockchain may include a first block that includes a smart contract (e.g., which may be generated by the account security platform, as described below), a second block that includes attempted login information for a first attempted login made by the user, a third block that includes account configuration information for a first password reset attempt made by the user, and a fourth block that includes user behavior metadata that identifies a behavior exhibited by the user during an attempt to login to the account.

Additionally, or alternatively, the distributed ledger may be used to store user preferences information for the group of users. The user preferences information may include one or more preferences specifying which account access information of a user is permitted to be monitored, one or more preferences specifying when account access information is permitted to be monitored, one or more preferences specifying how account access information is to be monitored, and/or the like. In some cases, the organization (and/or outside organizations) may attempt to analyze data regarding users and may generate user profiles based on the analyzed data. However, by storing the user preferences information as part of the distributed ledger, the users may maintain control over the type of data that the organization (and/or outside organizations) may utilize to generate the user profiles about the users.

In some implementations, the account security platform may generate and/or receive one or more smart contracts for a user and may store the one or more smart contracts as a record of the distributed ledger. For example, a smart contract may be received and stored as a record of the distributed ledger, such that the smart contract is able to be used to manage access to one or more accounts. A smart contract may include program code, a series of executable instructions, and/or one or more functions to verify and/or to determine whether a particular user accessing an account is an authorized user. Additionally, or alternatively, the smart contract may store information, such as account access information, user preferences information, an identifier of a user, and/or the like.

In some implementations, a smart contract may be configured to receive input (e.g., account access information, user preferences information, and/or the like), to process the input, and to generate an account security score based on the processed input. The account security score may represent a likelihood that an account is being accessed by an authorized user, a likelihood that a manner in which an account is being accessed is a permissible type of account access, and/or the like.

In some implementations, a distributed file system may be supported by the network of nodes and/or one or more other server devices. In this case, the distributed file system may be used to store the account access information and/or the user preferences information. Additionally, the distributed ledger may store encrypted identifiers (e.g., hashed addresses) for particular account access information, where the encrypted identifiers serve as pointers to memory locations at which the particular account access information is stored within the distributed file system. In this case, when a node captures account access information of a user (as shown in FIG. 1), the node may use a content addressing technique to process an identifier of the user to generate a cryptographic hash value that serves as the encrypted identifier. The cryptographic hash value may identify a storage location at which the account access information is to be stored within the distributed file system.

In this way, the network of nodes uses the distributed ledger (and/or the distributed file system) to manage access to the set of accounts.

Figure 1B:
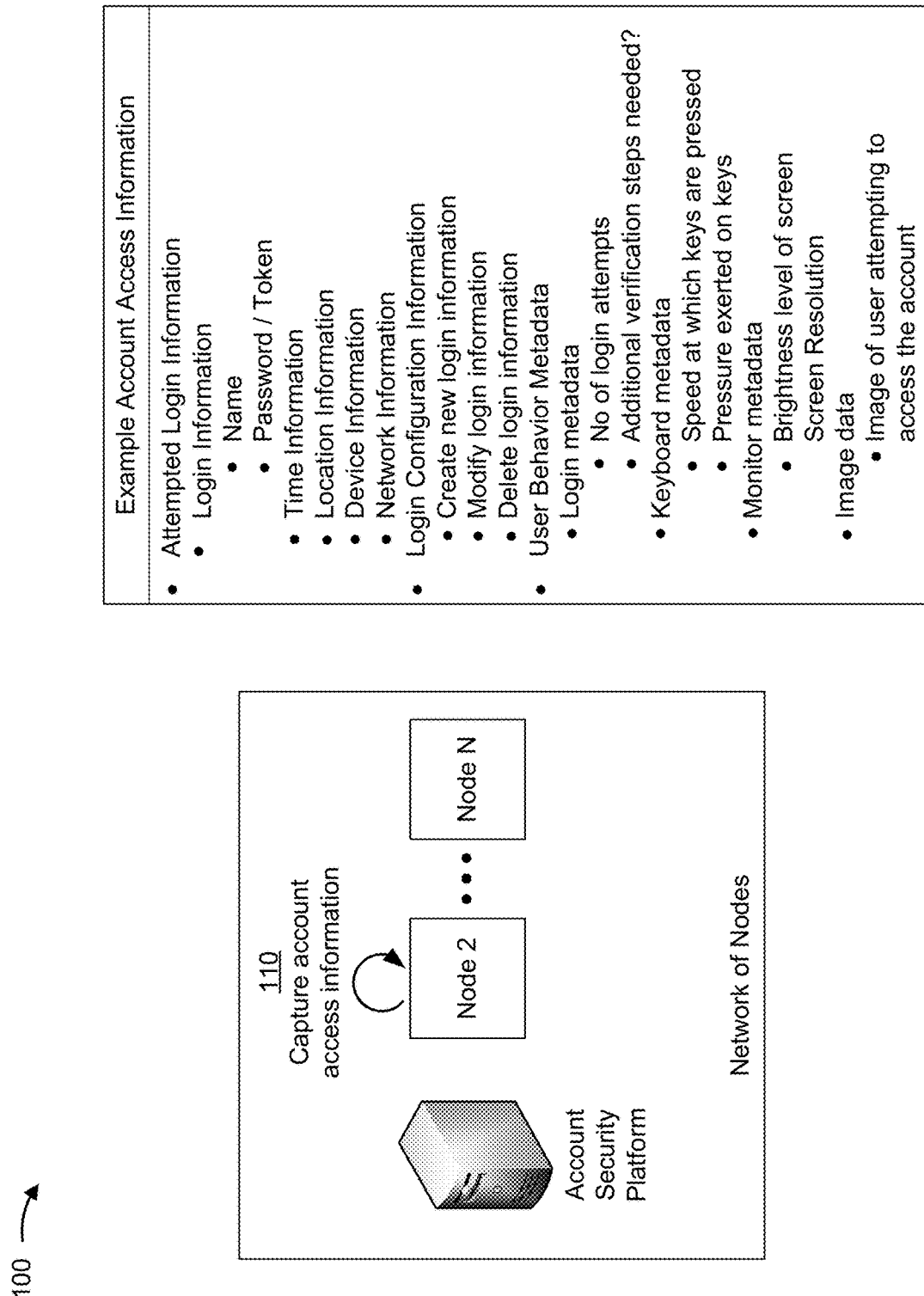

As shown in FIG. 1B, and by reference number 110, the second node (shown as node 2), of the network of nodes, may capture account access information. For example, the second node, which may be accessible to a user associated with the organization, may be configured with one or more reporting tools, and may use the one or more reporting tools to capture account access information relating to the attempt that the user is making to access an account.

The account access information may include attempted login information that identifies and/or describes attempts that users have made to login to particular accounts, login configuration information that identifies and/or describes attempts to modify login information for particular accounts, user behavior metadata that describes one or more user interactions with particular technology resources during attempts to login or during attempts to modify login information for particular accounts, and/or the like. The attempted login information may include login information (e.g., a username, a password and/or a token, and/or the like), information identifying the users (e.g., a name, a date of birth, an address, a driver's license identifier, and/or the like), time information that indicates times at which attempts to login are made, location information that identifies geographic locations of particular nodes when the attempts to login are made (e.g., geographic coordinates of the particular nodes), login result information that identifies whether the attempt to login was successful, device information for the particular nodes (e.g., an internet protocol (IP) address of a node, a media access control (MAC) address associated with the node, and/or the like), device information for one or more other devices or nodes that assisted in accessing the account (e.g., if a teller assists in modifying login information, the location information of a device used by the teller may be provided), and/or the like.

The login configuration information may include information associated with an attempt to create new login information, information associated with an attempt to modify existing login information, information associated with deleting existing login information, and/or the like. For example, the information associated with the attempt to create the new login information may include a request made by a user to create new login information, to modify existing login information, and/or to delete existing login information; information identifying a result of the attempt to create the login information, to modify the existing login information, and/or to delete the existing login information; call center information relating to the attempt to create the new login information, to modify the existing login information, and/or to delete the existing login information, and/or the like. The call center information may include an audio file of a recording between the user and a customer service representative that assisted the user with a particular task, may include an image file of a conversation between the user and a customer service representative (e.g., via a chat interface), may include a text file that describes a conversation between the user and the customer service representative (e.g., which may be generated based on the audio file and/or the image file), and/or the like.

The user behavior metadata may include login metadata, keyboard metadata, monitor metadata, image data, and/or the like. For example, the login metadata may include data that identifies a quantity of attempts that a user has made to login, data that identifies a time at which an attempt to login is made, data that identifies whether additional verification of a user is needed, and/or the like. The keyboard metadata may include data that identifies a speed at which users select particular keys of a keyboard, data that identifies an amount of pressure exerted on hardware components of particular nodes (e.g., an amount of pressure exerted on a keyboard while typing, an amount of pressure exerted on a mouse while clicking, and/or the like). The monitor metadata may include interface configuration data that identifies one or more properties of a display screen of a node (e.g., data that identifies a brightness level of a display screen, data that identifies a resolution for a display screen, and/or the like), user interaction data that identifies interactions that a user makes with a display screen of a node (e.g., if the display screen is a touch screen), and/or the like. The image metadata may include data that identifies an image of at least a portion of a user that is attempting to access an account, data that identifies at least a portion of a workspace of a user, and/or the like.

In some implementations, the second node (and/or one or more other nodes) may be configured with the one or more reporting tools that are capable of capturing the account access information. A reporting tool may include one or more features for capturing the attempted login information, one or more features for capturing the login configuration information, one or more features for capturing the user behavior metadata, and/or the like, as further described below.

In some implementations, the second node may use a first reporting tool to capture attempted login information for an attempt that a user has made to login to an account. For example, the second node may capture attempted login information using an image capturing technique, an interface scraping technique, and/or the like. The image capturing technique may take periodic screenshots of the user interface, record a video of the user interface, and/or the like. If the image capturing technique takes periodic screenshots, image files may be created that include the attempted login information, display information for other aspects of the user interface (e.g., aspects not part of the attempted login information), and/or the like. If the image capturing technique records a video, a media file may be created that includes a set of frames with the attempted login information. Additionally, when capturing the image files and/or the media file, the second node (e.g., using the first reporting tool) may generate a time stamp indicating a time at which a login attempt was made. The first tool may also be used to capture login configuration for an attempt that a user has made to modify existing login information of the account.

As an example, the second node may use the first tool to capture login configuration information that includes call center information that describes the attempt to modify the existing login information. In this example, the second node may generate an audio file of a recording between the user and a customer service representative that assisted in modifying the existing login information, may generate an image of a conversation between the user and the customer service representative (e.g., via a chat interface), and/or the like.

Additionally, or alternatively, the second node may use one or more other reporting tools to capture user behavior metadata that describes one or more user interactions that the user has with the second node while attempting to login or while attempting to generate, modify, and/or delete login information of the account. The one or more interactions with the second node may include one or more interactions with hardware components of the second node (e.g., a user interface, such as a display screen, a keyboard, a mouse, and/or the like), one or more interactions with a service accessible via the second node (e.g., a software application that the user is attempting to access via the login interface), and/or the like.

To provide a specific example, the second node may use a second reporting tool to generate login metadata that specifies a number of login attempts made by the user, that specifies whether additional verification of the user may be needed, and/or the like. For example, the second reporting tool may track login metadata for the user over a given time period, login information of the account, and/or the like. Additionally, if the user has input an incorrect password a particular number of times, the second reporting tool may generate a value specifying the number of times that the user has input the incorrect password, may generate a value indicating that the number of times that the user has input the incorrect password satisfies a threshold value (e.g., which may trigger the second node to generate login metadata specifying that additional verification of the user is needed), and/or the like.

Additionally, or alternatively, and provided as another example, the second node may use a third reporting tool to generate keyboard metadata. In this example, the third reporting tool may be capable of detecting keyboard strokes made by the user and may generate keyboard metadata that identifies particular keys input by the user and timestamps that indicate times at which the particular keys were input by the user. In some cases, the second node may also use the third reporting tool to generate additional keyboard metadata specifying a speed at which the user selected the particular keys, an amount of pressure exerted on the keyboard, and/or the like. For example, the second node may use the third reporting tool to process the keyboard metadata (described above) to generate a word per minute (WPM) count of the user while inputting the login information, an average amount of pressure exerted on the keyboard while inputting the login information, and/or the like.

Additionally, or alternatively, and provided as another example, the second node may use a fourth reporting tool to capture monitor metadata. In this example, the fourth reporting tool may be capable of capturing interface configuration data for a display screen of the second node and/or user interaction data for interactions that the user makes with the display screen of the second node. In this example, the second node may capture interface configuration data that identifies a brightness level of the display screen, data that identifies a resolution of the display screen, and/or the like. If the display screen is a touchscreen, the second node may use the fourth reporting tool to generate keyboard metadata that identifies particular parts of the display screen that the user has interacted with (e.g., selected, clicked on, and/or the like), time stamps indicating times at which the particular interactions occurred, and/or the like.

Additionally, or alternatively, and provided as another example, the second node may use a fifth reporting tool to capture image data that identifies the user that is attempting to access the account and/or image data that identifies an environment of the user. In this example, the second node may use a camera component to capture an image of the user, may use a first set of computer vision techniques (e.g., which may be part of the fourth reporting tool) to process image data to identify a portion of the image that depicts the user, and may use a second set of computer vision techniques to identify that the user is an authorized user. The first set of computer vision techniques may include techniques for identifying one or more parts of the user, such as a facial recognition technique, a technique for identifying a part of a face of a user (e.g., an eye, a nose, and/or the like), and/or the like. The second set of computer vision techniques may include techniques for verifying whether the identified user is an authorized user, such as an image comparison technique, an attribute comparison technique, a technique using machine learning, and/or the like.

One or more implementations described below may involve transmission of data between two or more devices. For example, the second node may transmit data to one or more other nodes in the network (e.g., the account security platform, a third node, and/or the like), to the distributed ledger, to the distributed file system, and/or the like. The data may include the account access information, the user preferences information, user behavior analytics (UBA) information (defined further herein), an encrypted identifier associated with one or more data types described above, and/or the like. Additionally, or alternatively, the account security platform may transmit the data to one or more other nodes in the network, to the distributed ledger, to the distributed file system, and/or the like.

In one or more of these cases, the second node (and/or the account security platform) may securely transmit the data using one or more encryption techniques. For example, the second node (and/or the account security platform) may use a hash function, a content addressing technique, a technique using a key pair (e.g., a public key and a private key), and/or the like, to encrypt the data prior to transmission over the network. Additionally, a receiving device may, in some cases, use the one or more decryption techniques to decrypt the encrypted data. As a specific example, the receiving device may use a private key to decrypt the encrypted data. The receiving node may be the account security platform, the second node, another node in the network, a device hosting the distributed ledger, a device hosting the distributed file system, and/or the like.

In this way, as the user interacts with the second node to access the account, the second node captures the account access information that is to be used to verify whether the user is an authorized user, to create a record in a verifiable list of records that identifies and/or describes the attempt to access the account, and/or the like, as described further herein.

Figure 1C:
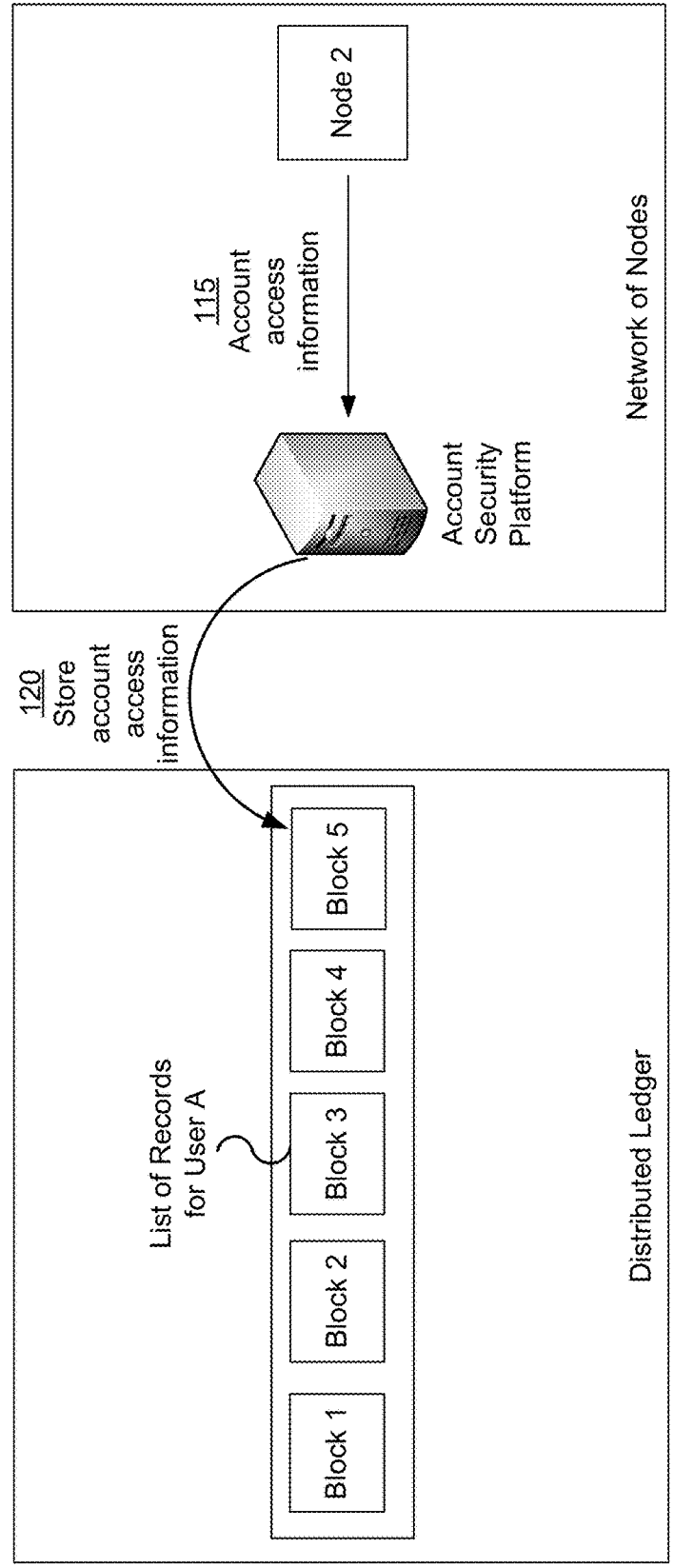

As shown in FIG. 1C, and by reference number 115, the second node may provide the account security platform with the account access information. For example, the second node may use an application programming interface (API) and/or another type of communication interface to provide the account security platform with the account access information. This may allow the account security platform to update the distributed ledger, as explained further herein.

Additionally, or alternatively, the second node may provide the account security platform with the encrypted identifier. For example, in some cases, the distributed file system may be used to store the account access information. In these cases, the second node may use a public key to encrypt an identifier of the user and may store the account access information at a storage location of the distributed file system that is identifiable via the encrypted identifier. Additionally, the second node may provide the encrypted identifier to the account security platform (e.g., to permit the account security platform to use the encrypted identifier to identify the storage location of the account access information).

In some implementations, the account security platform may use the account access information to generate user behavior analytics (UBA) information. For example, the account security platform may generate the UBA information by using a set of data comparison rules to process the account access information, historical account access information for the account, user preferences information of the authorized user, and/or the like, as will be further described below.

In some implementations, the UBA information may be used as part of a behavior profile of the user. In some implementations, the UBA information may include a first dataset of analytics associated with the attempted login information, a second dataset of analytics associated with the login configuration information, a third dataset of analytics associated with the user behavior metadata, and/or the like. A dataset of analytics associated with the account access information may identify and/or describe one or more relationships between the account access information associated with the user's attempt to access the account and historical account access information associated with the authorized user's prior attempts to access the account. A relationship may identify and/or describe one or more similarities between two or more types of information, one or more differences between two or more types of information, a degree of similarity between the two or more types of information, a degree to which the two or more types of information are different, and/or the like.

The first dataset of analytics associated with the attempted login information may identify and/or describe a relationship between the login information provided by the user and historical login information provided by the authorized user during past login attempts, a relationship between the time information indicating the time at which the user attempted to login and historical time information indicating past times at which the authorized user has previously logged in, a relationship between the location information provided by the user and historical location information provided by the authorized user during past login attempts, and/or the like. To provide a specific example, the first dataset of analytics may include one or more values that identify and/or describe a relationship between a password provided by the user and one or more passwords that have been previously provided by the authorized user (e.g., a value might identify a similarity and/or a difference between the password and the one or more passwords, such as a similarity and/or a difference relating to particular characters used, password length, password uniqueness, password reusability, and/or the like).

The second dataset of analytics associated with the login configuration information may identify and/or describe a relationship between new login information provided by the user and previously provided new login information that had been provided by the authorized user (e.g., such as when the authorized user changed a password for the account), a relationship between existing login information provided by the user and previously provided existing login information that had been provided by the authorized user, and/or the like. As a specific example, the second dataset of analytics may include one or more values that identify and/or describe a degree to which a password has been changed relative to a previously used password. This may be indicative of fraudulent account access if, for example, the authorized user always maintains variations of the same password and the user (who may be an unauthorized user) attempts to change the password to a set of characters that are significantly different than the variations of password that had been previously used by the authorized user.

The third dataset of analytics associated with the user behavior metadata may identify and/or describe one or more relationships between the login metadata, keyboard metadata, monitor metadata, and/or image data captured based on the user's attempt to access the account and historical login metadata, historical keyboard metadata, historical monitor metadata, and/or historical image data that had been previously captured based on the authorized user's prior attempts to access the account. As a specific example, the third dataset of analytics may include one or more values that identify and/or describe a difference between a speed at which the user entered the login information and speeds at which the authorized user had previously entered the login information. As another example, the third dataset of analytics may include one or more values that identify and/or describe a difference between a pressure exerted on the keys of a keyboard of the second node when the user entered the login information and pressures at which the authorized user had previously exerted on the keys of a keyboard while entering the login information.

In some implementations, the account security platform may use the set of data comparison rules to process the account access information and to generate the UBA information. The set of data comparison rules may include a first rule indicating to determine a quantifiable difference between two or more corresponding values, a second rule indicating to determine a quantifiable similarity between two or more corresponding values, and/or the like. A value included in the account access information may correspond to one or more values included in the historical account access information (e.g., login information provided by the user and historical login information previously provided by the authorized user), may correspond to an average (and/or a weighted average) between multiple values included in the historical account access information, and/or the like.

In this way, the account security platform may generate UBA information that may be used to determine a likelihood that the user is the authorized user, as will be described further herein.

As shown by reference number 120, the account security platform may store the account access information as a record of the distributed ledger. For example, the account security platform may parse the account access information to locate the identifier of the user (e.g., which is stored as part of the account access information). In this case, the account security platform may use the identifier to locate, within the distributed ledger, a corresponding identifier that is stored in association with a list of records that correspond to the user. This may allow the account security platform to cause the account access information to be stored as a new record of the list of records. In the example shown, the account security platform may generate a fifth block in the blockchain that may be used to store the account access information.

In some implementations, such as when the distributed file system is used to store the account access information, the account security platform may cause an encrypted identifier of the user to be stored as a new record in the distributed ledger (e.g., instead of the account access information). This may allow other nodes to reference the distributed ledger to access the encrypted identifier of the user, to use a private key to decrypt the encrypted identifier of the user, and to use the decrypted identifier to obtain the account access information from the distributed file system.

In some implementations, the second node may cause the account access information to be stored as a record of the distributed ledger (e.g., without the use of the account security platform). Additionally, or alternatively, the second node may cause the encrypted identifier of the user to be stored as a record of the distributed ledger (e.g., without the use of the account security platform).

In some implementations, the second node (or the account security platform) may provide the account access information to one or more other nodes in the network. For example, if each node in the network is responsible for updating a local copy of the distributed ledger, then the second node (or the account security platform) may broadcast the account access information to each node in the network. This may allow the one or more other nodes to update each local copy of the distributed ledger (e.g., by storing the account access information as a new record). If each node has read and write access to a local copy of the distributed ledger, and read only access to copies of the distributed ledger that are maintained by other nodes, then each node may be able to independently verify the contents of the distributed ledger (e.g., by comparing contents of a local copy of the distributed ledger to one or more other copies of the distributed ledger).

In this way, the account security platform and/or the second node may cause the account access information (and/or an encrypted identifier of the user) to be stored as part of the distributed ledger.

Figure 1D:
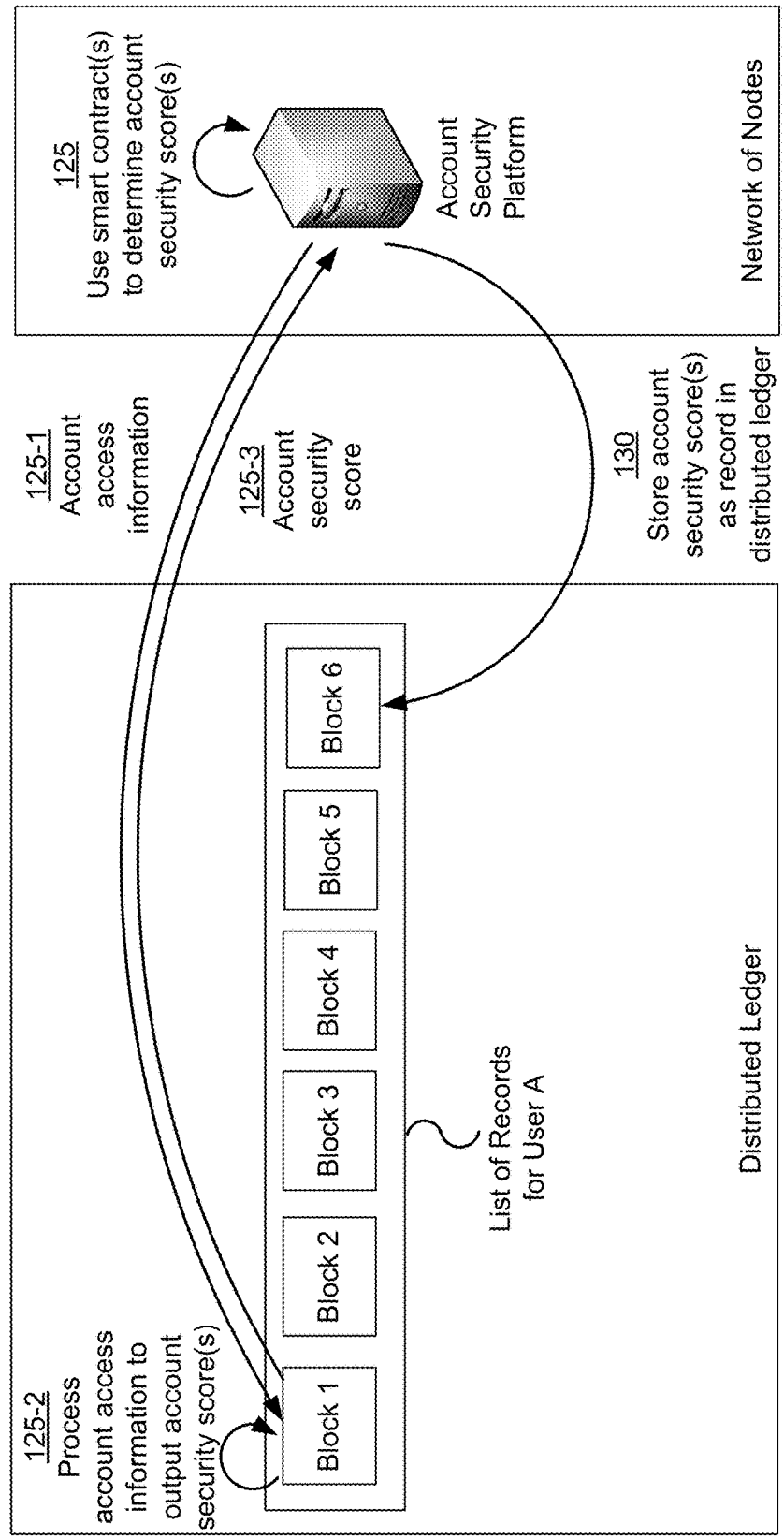

As shown in FIG. 1D, and by reference number 125, the account security platform may use the one or more smart contracts to determine one or more account security scores. For example, the account security platform may use the one or more smart contracts that are stored by the distributed ledger to determine one or more account security scores. In this case, the account security platform may determine the likelihood that the user accessing the account is the authorized user based on an account security score, based on multiple account security scores, based on an average of multiple account security scores, based on a weighted average of multiple account security scores, and/or the like.

An account security score may represent a likelihood of the user that accessed the account being the authorized user, may represent a likelihood that a manner in which the account is being accessed is a permissible type of account access, may be used (e.g., with other account security scores) to determine another value that represents one or more of the likelihoods described above, and/or the like. For example, each account security score may have a range of possible values (e.g., a lowest available score may be associated with a lower security risk and a highest available score may be associated with a higher security risk).

To determine the one or more account security scores, and as shown by reference number 125-1, the account security platform may provide the account access information as input to the one or more smart contracts. For example, the account security platform may use the API or another communication interface to provide the account access information as input to the one or more smart contracts. As shown by reference number 125-2, this may cause the one or more smart contracts to process the account access information (and/or user preferences information of the authorized user) and to output the one or more account security scores. As shown by reference number 125-3, the account security platform may receive, from the one or more smart contracts, the one or more account security scores. Several examples are provided below.

As a first example, the first smart contract may receive and process login information that includes a password to access the account. In this example, the first smart contract may compare attributes of the password used in the attempt to login and corresponding attributes of a configured password for the account. This may allow the first smart contract to generate an account security score based on the comparison. As a particular example, the first smart contract may be configured with a range of possible account security scores, where a score of one is associated with a low security risk and a score of ten is associated with a high security risk. If, for example, the attributes and the corresponding attributes match or are very similar, the first smart contract might output an account security score associated with a low security risk (e.g., a value of one, a value of two, and/or the like).

Furthermore, while the example above involves processing only one type of account access information, it is to be understood that this is provided by way of example. In practice, the first smart contract may generate one or more account security scores based on an analysis of multiple types of account access information (e.g., such as by comparing a speed at which the user interacted with keys of a keyboard while inputting the password and speeds at which the authorized user had interacted with keys while previously inputting the password, by comparing pressure exerted on keys used to input the password and pressures exerted on keys that the authorized user used when previously inputting the password, and/or the like). This may allow the account security score (or multiple account security scores) to represent an overall likelihood that the user accessing the account is the authorized user.

In some cases, the one or more account security scores may represent the likelihood that the user accessing the account is the authorized user. In other cases, the account security platform may use the one or more account security scores to determine one or more other values that represent the likelihood that the user accessing the account is the authorized user. For example, the account security platform may determine a group of account security scores, may determine an average account security score (or a weighted average), and may use the average account security score (or the weighted average) as the value that represents the likelihood that the user accessing the account is the authorized user.

In some implementations, the account security platform may use a data model that has been trained using machine learning to determine the account security score. To train the data model, the account security platform may have processed historical data for a group of users to determine a set of features that were to be used to train the data model.

The historical data may include historical account access information, historical user preferences information, historical UBA information, and/or the like. The set of features may be determined using feature detection and/or selection techniques, such as a technique that involves text mining and latent semantic analysis (LSA), a trend variable analysis technique, an interest diversity analysis technique, a technique using a neural network, a composite indicators analysis technique, a clustering technique, a regression technique, and/or the like. The set of features may include values that affect a likelihood that a particular user accessing an account is the authorized user of that account. For example, the set of features may include particular account access information values, particular user preferences information values, particular UBA information values, and/or the like. In some cases, the account security platform may receive a trained data model.

To use the data model, the account security platform may provide, as input data to the data model, the account access information associated with the user, the user preferences information for the authorized user, the UBA information, and/or the like, to cause the data model to output one or more account security scores. In some cases, the data model may be supported as a record in the distributed ledger and the account security platform may obtain the one or more account security scores by referencing the distributed ledger (e.g., in the same manner used to access the one or more smart contracts, as described above).

In this way, the account security platform determines an account security score that represents a likelihood of the account being accessed by an authorized user (and/or may be used to determine another value that represents the likelihood of the account being accessed by the authorized user), as further described below.

Figure 1E:
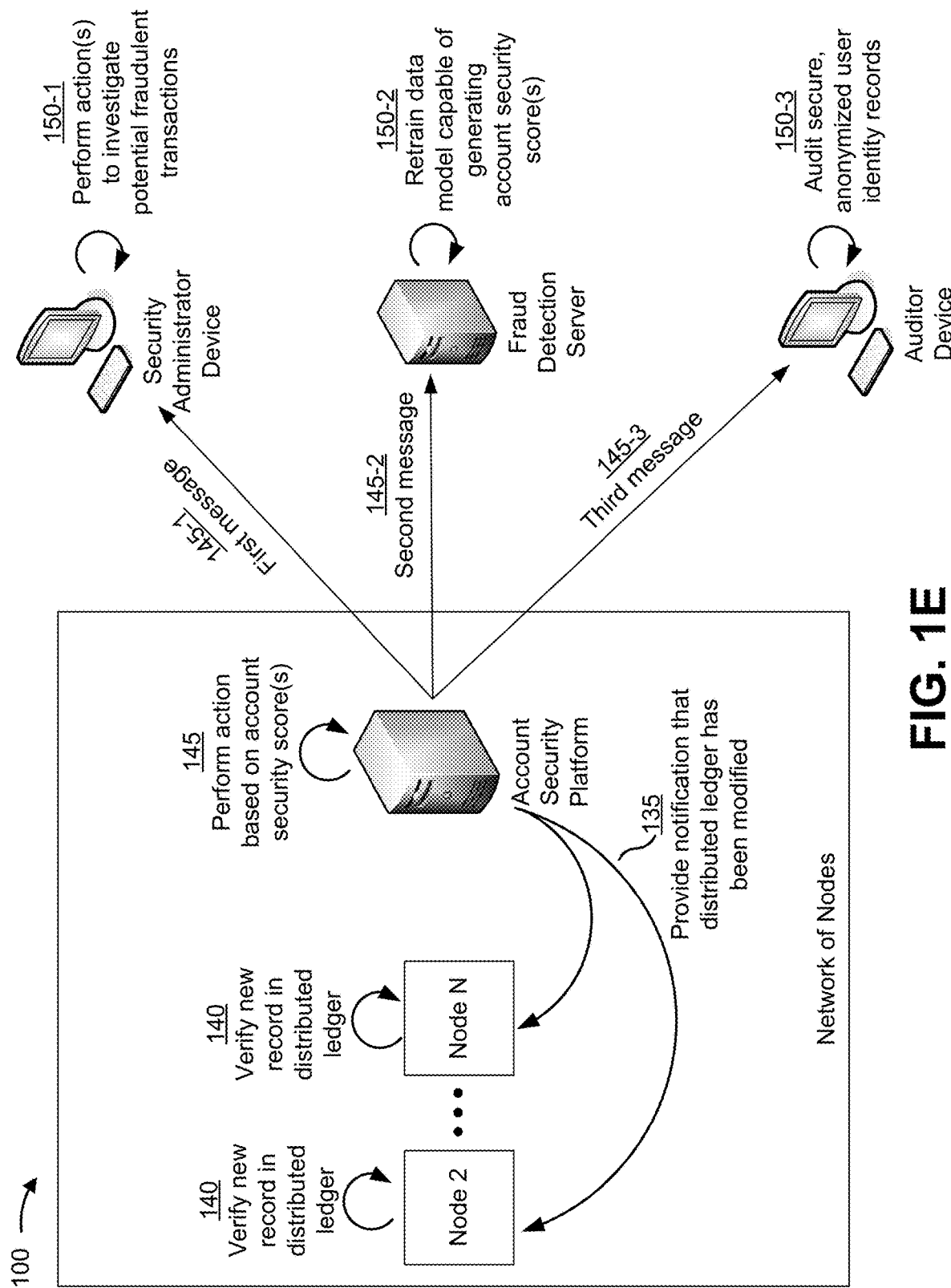

As shown in FIG. 1E, and by reference number 135, the account security platform may provide, to one or more other nodes in the network, a notification indicating that the distributed ledger has been modified. For example, the account security platform may use the API or the other communication interface to provide (e.g., transmit, broadcast, and/or the like), to the one or more nodes, a notification indicating that the distributed ledger has been modified. This may allow the one or more other nodes to access the distributed ledger to verify the new record that has been added, as further described below.

In some implementations, the account security platform may broadcast a secure copy of the distributed ledger that has been modified to the one or more other nodes. For example, the account security platform may generate a cryptographic hash of the distributed ledger. In this case, each record in the distributed ledger may include the cryptographic hash of the prior record, such that each record in the list of records is linked together. Additionally, the cryptographic hash may be stored using a data structure, such as a Merkle tree, which may store hashed data in a manner that allows other nodes in the network to verify the hashed data. This may allow the account security platform to broadcast the cryptographic hash of the distributed ledger to the one or more other nodes.

As shown by reference number 140, the one or more other nodes (shown as node 2 through node N) may verify the new record in the distributed ledger. For example, the one or more other nodes may perform another cryptographic hash of the secured blockchain that allows the other nodes to verify the record that has been added to the blockchain. As another example, the one or more other nodes may perform the other cryptographic hash to decrypt the secure distributed ledger. This may allow the one or more other nodes to compare the decrypted distributed ledger (e.g., which includes the new record) to a local copy of the distributed ledger to verify the new record. In this way, nodes may independently verify each record that is added to the distributed ledger, thereby improving security and providing failover protection (e.g., if the account security platform fails, another node may become the master node and may use the copy of the distributed ledger to perform one or more functions of the master node).

As shown by reference number 145, the account security platform may perform one or more actions based on the one or more account security scores. For example, the account security platform may be configured with one or more threshold ranges of account security scores and may select an action to perform based on the one or more account security scores falling within a particular threshold range of account security score.

As shown by reference number 145-1, the account security platform may provide, to the security administrator device, a first message that includes the one or more account security scores, a set of instructions specifying one or more recommended actions to perform, the account access information, the user preferences information, the UBA information, and/or the like. As shown by reference number 150-1, this may cause the security administrator device to perform one or more actions to investigate a potentially fraudulent attempt to access the account. For example, the security administrator device may automatically contact the authorized user to verify the access to the account (e.g., via a short message service (SMS) message, via electronic mail (e-mail), via an automated phone call, and/or the like), may cause the user that is attempting to access the account to perform one or more additional forms of authentication, and/or the like.

Additionally, or alternatively, and as shown by reference number 145-2, the account security platform may provide, to the fraud detection server, a second message that includes the one or more account security scores, a set of instructions specifying one or more recommended actions to perform, the account access information, the user preferences information, the UBA information, and/or the like. As shown by reference number 150-2, the fraud detection server may, based on receiving the second message (and/or other relevant information), retrain the data model that is capable of generating the one or more account security scores. For example, the second message may specify that there is a high likelihood that the user that attempted to access the account is not the authorized user. If the fraud detection server also receives information indicating that the access to the account is in fact permissible access, then the fraud detection server may retrain the data model (e.g., such that, over time, the data model may improve the level of accuracy of the one or more account security scores that are generated).

Additionally, or alternatively, and as shown by reference number 145-3, the account security platform may provide, to the auditor device, a third message that includes the one or more account security scores, a set of instructions specifying one or more recommended actions to perform, the account access information, the user preferences information, the UBA information, and/or the like. As shown by reference number 150-3, the auditor device may, after receiving the second message (and/or other relevant information), perform an audit of secure, anonymized user identity records. For example, the auditor device may perform an audit of the records stored as part of the distributed ledger, which may include auditing anonymized account access information, anonymized historical account access information, anonymized user preferences information, anonymized UBA information, and/or the like. In some cases, the auditor device may provide, to one or more nodes of the network, an indication that the records have been audited. Additionally, or alternatively, the auditor device may be a node in the network and may add a record to the distributed ledger that indicates that the distributed ledger has been audited.

In this way, the account security platform uses the distributed ledger to monitor, verify, and/or manage access to the account of the authorized user. Additionally, the account security platform facilitates the distribution of account access information in a manner that is flexible, secure, and distributed. For example, flexibility is provided by enabling execution of various smart contracts that are able to process different types of account access information that may be processed to verify whether the user is the authorized user.

As indicated above, FIGS. 1A-1E are provided as one or more examples. Other examples can differ from what is described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
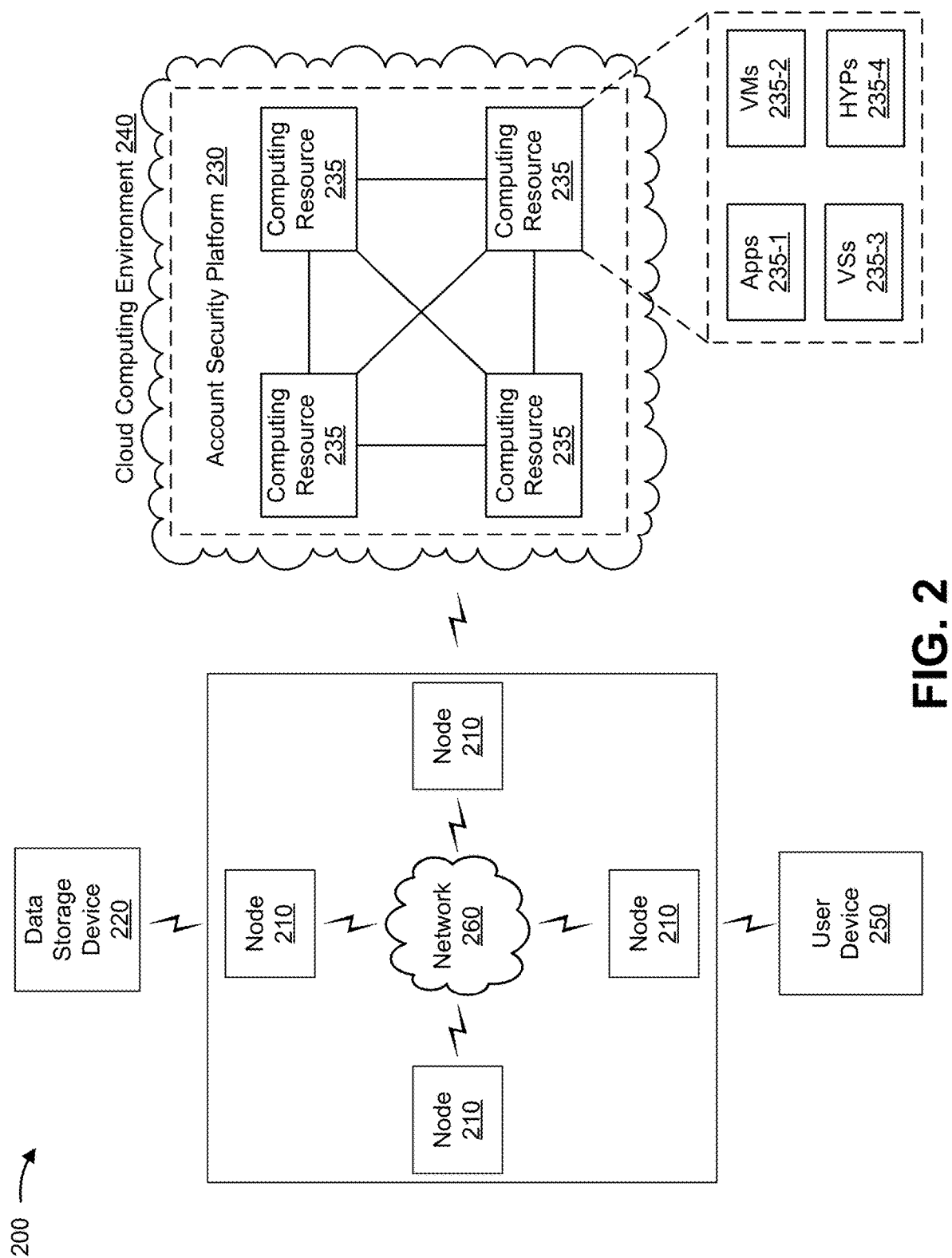
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network of nodes 210, a data storage device 220, an account security platform 230 hosted within a cloud computing environment 240, a user device 250, and a network 260. Devices of environment 200 may interconnect via wired connections, wireless connections, or a combination of wired and wireless connections.

Node 210 includes one or more devices capable of receiving, generating, storing, processing, and/or providing information associated with one or more accounts. For example, node 210 may include a computing device (e.g., a desktop computer, a laptop computer, a tablet computer, a handheld computer, a server device, and/or the like), a mobile phone (e.g., a smart phone, a radiotelephone, and/or the like), or a similar device.

In some implementations, a group of nodes 210 may be part of a network that is able to utilize a distributed ledger and/or a distributed file system to securely manage access to a group of accounts that users utilize to perform tasks for an organization. In some cases, the group of nodes 210 may store local copies of the distributed ledger and may have access to the distributed file system. In other cases, the group of nodes 210 may have access to the distributed ledger (e.g., which may be hosted by other server devices). In some implementations, the group of nodes 210 may be part of an identity and access management (IAM) system. In some implementations, the group of nodes 210 may perform one or more actions described in connection with FIGS. 1A-1E.

Data storage device 220 includes one or more devices capable of receiving, generating, storing, processing, and/or providing information associated with one or more accounts. For example, data storage device 220 may include a computing device, such as a server, a desktop computer, a laptop computer, a tablet computer, a handheld computer, or a similar device.

In some implementations, a first group of data storage devices 220 may support a distributed ledger that uses a data structure (e.g., a blockchain) to store account access information for a group of users. The first group of data storage devices 220 may, in some cases, be a group of nodes 210, or, in other cases, may be separate server devices that are not part of the group of nodes 210. Additionally, or alternatively, a second group of data storage devices 220 may support a distributed file system that is used to store account access information for the group of users. In some implementations, the second group of data storage devices 220 may use the distributed file system to store encrypted identifiers for the group of users in association with the account access information of the group of users. While implementations described herein refer to a distributed file system, it is to be understood that one or more of the implementations may be implemented using a file system (e.g., that is not distributed).

Account security platform 230 includes one or more devices capable of receiving, generating, storing, processing, and/or providing information associated with one or more accounts. For example, account security platform 230 may include a server device (e.g., a host server, a web server, an application server, etc.), a data center device, or a similar device.

In some implementations, account security platform 230 may perform one or more actions described as being performed by node 210. In some implementations, account security platform 230 may serve as a master node or a management node for the group of nodes 210. In some implementations, account security platform 230 may be separate from the group of nodes 210 but may interact with the group of nodes 210. In some implementations, account security platform 230 may generate a smart contract for an individual or a group of individuals. In some implementations, account security platform 230 may obtain account access information by referencing a distributed file system (e.g., supported by data storage device 220). In some implementations, account security platform 230 may be part of the IAM system. In some implementations, account security platform 230 may perform one or more actions described in connection with FIGS. 1A-1E.

In some implementations, as shown, account security platform 230 may be hosted in cloud computing environment 240. Notably, while implementations described herein describe account security platform 230 as being hosted in cloud computing environment 240, in some implementations, account security platform 230 may not be cloud-based (i.e., may be implemented outside of a cloud computing environment) or may be partially cloud-based.

Cloud computing environment 240 includes an environment that hosts account security platform 230. Cloud computing environment 240 may provide computation, software, data access, storage, etc. services that do not require end-user knowledge of a physical location and configuration of system(s) and/or device(s) that hosts account security platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host account security platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 may include one or more software applications that may be provided to or accessed by node 210, data storage device 220, and/or user device 250. Application 235-1 may eliminate a need to install and execute the software applications on these devices. For example, application 235-1 may include software associated with account security platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., node 210, data storage device 220, and/or user device 250), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

User device 250 includes one or more devices capable of receiving, generating, storing, processing, and/or providing information associated with one or more accounts. For example, user device 250 may include a computing device (e.g., a desktop computer, a laptop computer, a tablet computer, a handheld computer, a server device, and/or the like), a mobile phone (e.g., a smart phone, a radiotelephone, and/or the like), or a similar device. In some implementations, a first user device 250 may be a device associated with a security administrator. In some implementations, a second user device 250 may be a device associated with an auditor. In some implementations, one or more other user devices 250 may be part of the group of nodes 210.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
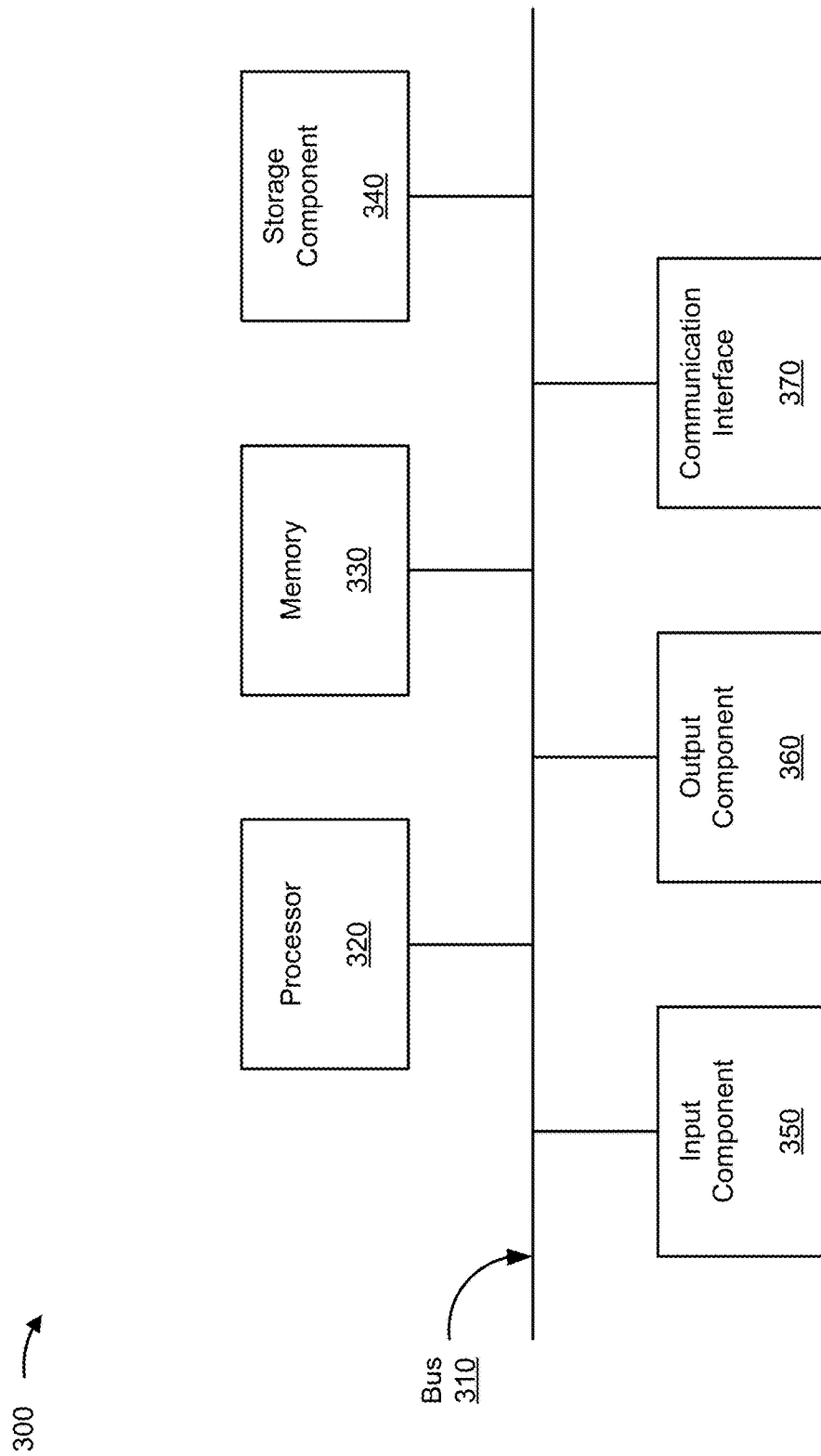
FIG. 3 is a diagram of example components of one or more devices of FIG. 2.

FIG. 3 is a diagram of example components of a device 300. Device 300 may correspond to node 210, data storage device 220, account security platform 230, and/or user device 250. In some implementations, node 210, data storage device 220, account security platform 230, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
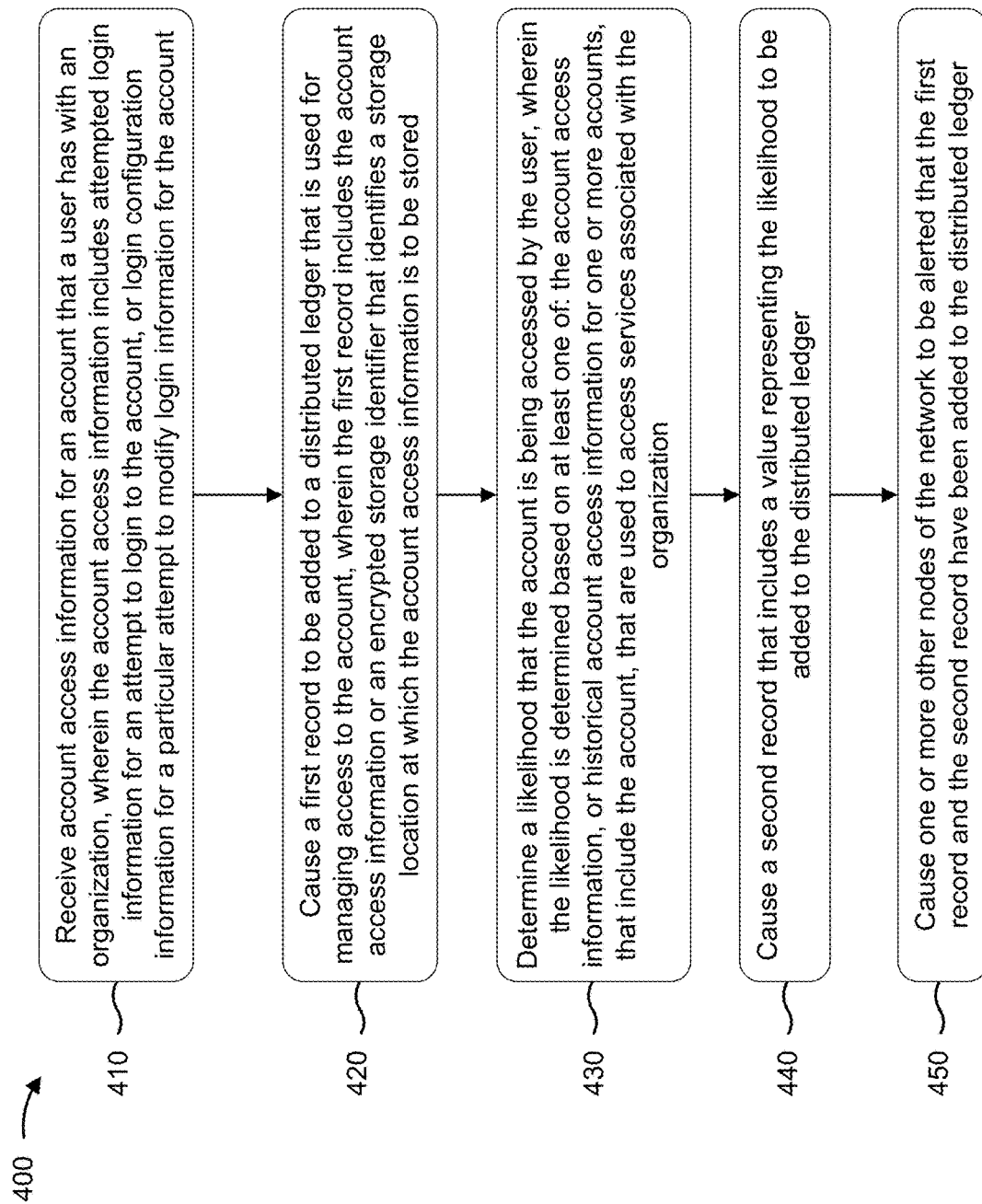

FIG. 4 is a flow chart of an example process 400 for using a distributed ledger to determine a likelihood that a user accessing an account is an authorized user and for performing one or more actions based on the likelihood that the user is the authorized user. In some implementations, one or more process blocks of FIG. 4 may be performed by a node (e.g., node 210, an account security platform, such as account security platform 230, and/or the like). In some implementations, one or more process blocks of FIG. 4 may be performed by another device or a group of devices separate from or including the node, such as one or more other nodes (e.g., one or more other nodes 210), a data storage device (e.g., data storage device 220), a user device (e.g., user device 250), and/or the like.

As shown in FIG. 4, process 400 may include receiving account access information for an account that a user has with an organization, wherein the account access information includes attempted login information for one or more attempts to login to the account, or login configuration information for a particular attempt to modify login information of the account (block 410). For example, the node (e.g., using processor 320, memory 330, storage component 340, input component 350, communication interface 370, and/or the like) may receive account access information for an account that a user has with an organization, as described above. In some implementations, the account access information may include attempted login information for one or more attempts to login to the account, or login configuration information for a particular attempt to modify login information of the account. As used herein, the account that the user has with the organization may refer to an account linked to an identity and access management (IAM) system associated with the organization, an account for one or more specific services that the user utilizes to perform tasks for the organization, an account hosted and/or supported by a third party organization (e.g., who may have sold the organization a license to use a particular service), and/or the like.

As further shown in FIG. 4, process 400 may include causing a first record to be added to a distributed ledger that is used for managing access to the account, wherein the first record includes the account access information or an encrypted identifier that identifies a storage location at which the account access information is to be stored (block 420). For example, the node (e.g., using processor 320, memory 330, storage component 340, input component 350, output component 360, communication interface 370, and/or the like) may cause a first record to be added to a distributed ledger that is used for managing access to the account, as described above. In some implementations, the first record may include the account access information, or an encrypted identifier that identifies a storage location at which the account access information is to be stored.

As further shown in FIG. 4, process 400 may include determining a likelihood that the account is being accessed by the user wherein the likelihood is determined based on at least one of the account access information, or historical account access information for one or more accounts, that include the account, that are used to access services associated with the organization (block 430). For example, the node (e.g., using processor 320, memory 330, storage component 340, and/or the like) may determine a likelihood that the account is being accessed by the user, as described above. In some implementations, the likelihood may be determined based on at least one of: the account access information, or historical account access information for one or more accounts, that include the account, that are used to access services associated with the organization.

As further shown in FIG. 4, process 400 may include causing a second record that includes a value representing the likelihood to be added to the distributed ledger (block 440). For example, the node (e.g., using processor 320, memory 330, storage component 340, input component 350, output component 360, communication interface 370, and/or the like) may cause a second record that includes a value representing the likelihood to be added to the distributed ledger, as described above.

As further shown in FIG. 4, process 400 may include causing one or more other nodes of the network to be alerted that the first record and the second record have been added to the distributed ledger (block 450). For example, the node (e.g., using processor 320, memory 330, storage component 340, input component 350, output component 360, communication interface 370, and/or the like) may cause one or more other nodes of the network to be alerted that the first record and the second record have been added to the distributed ledger, as described above.

Process 400 may include additional implementations, such as any single implementation or any combination of implementations described below and/or in connection with one or more other processes described elsewhere herein.

In a first implementation, the account access information may include user behavior metadata that describes one or more user interactions with an application, which is part of the one or more services, during the attempt to login to the account, or during the particular attempt to modify the login information of the account. In some implementations, the node may generate user behavior analytics (UBA) information based on the user behavior metadata. In some implementations, the node may determine the value that represents the likelihood based on the UBA information.

In a second implementation, alone or in combination with the first implementation, the attempted login information may include at least one of: the login information of the account, time information that indicates a time at which the attempt to login, or the particular attempt to modify the login information for the account, is made, location information that identifies a geographic location of the node when the attempt to login or the particular attempt to modify the login information is made, or device information for the node.

In a third implementation, alone or in combination with one or more of the first and second implementations, the distributed ledger may be implemented by a blockchain. In some implementations, the first record in the distributed ledger may be a first block in the blockchain. In some implementations, blocks of the blockchain that correspond to the historical account access information include one or more encrypted identifiers. In some implementations, the node may identify one or more storage locations for the historical account access information based on the one or more encrypted identifiers found in the records of the distributed ledger. In some implementations, the node may obtain the historical account access information from the one or more storage locations. In some implementations, when determining the likelihood, the node may determine the value that represents the likelihood based on the account access information and the historical account access information.

In a fourth implementation, alone or in combination with one or more of the first through third implementations, the node, when determining the likelihood, may provide the attempted login information as input to a smart contract that is stored as a particular record in the distributed ledger, to cause the smart contract to output an account security score.

In a fifth implementation, alone or in combination with one or more of the first through fourth implementations, the node may receive, before receiving the account access information, user preferences information for the user. In some implementations, the node may generate, based on the user preferences information, a smart contract for the user that specifies permissible types of account access information that the user has consented to having monitored. In some implementations, the node may cause the smart contract to be stored as a particular record in the distributed ledger. In some implementations, when determining the likelihood, the node may provide the account access information as input to the smart contract to cause the smart contract to output an account security score based on the permissible types of account access information that the user consented to having monitored. In some implementations, the account security score may be the value that represents the likelihood that the account is being accessed by the user.

In a sixth implementation, alone or in combination with one or more of the first through fifth implementations, the node provides, to a particular device (e.g., a fraud detection server), a message that includes at least one of the account security score or the account access information. Additionally, the particular device may also receive an indication of whether the user accessing the account is in fact an authorized user. This may, based on receiving the message and the indication, cause the particular device to retrain a data model that uses machine learning to generate the account security score.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
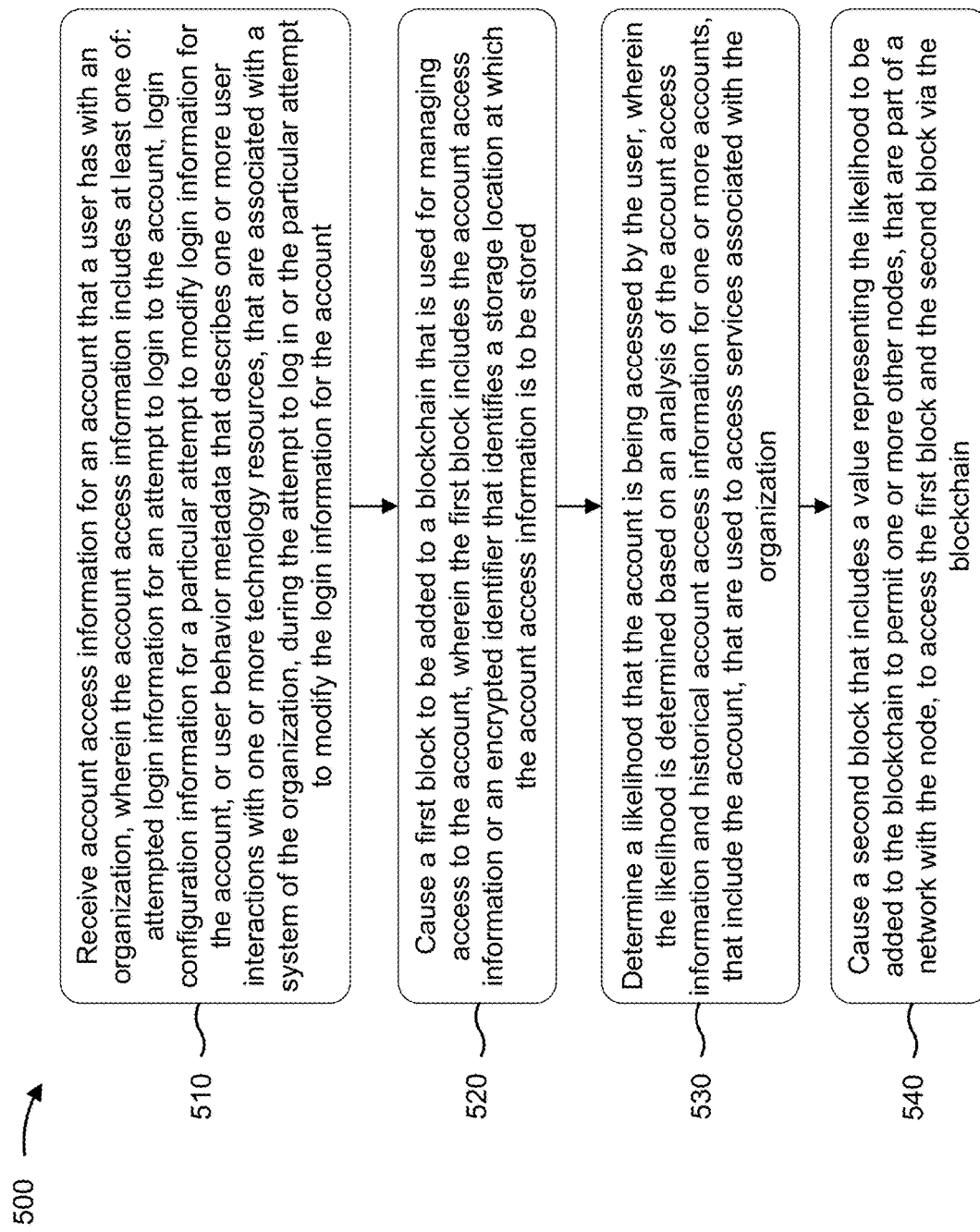

FIG. 5 is a flow chart of an example process 500 for using a distributed ledger to determine a likelihood that a user accessing an account is an authorized user and for performing one or more actions based on the likelihood that the user is the authorized user. In some implementations, one or more process blocks of FIG. 5 may be performed by a node (e.g., node 210, an account security platform, such as account security platform 230, and/or the like). In some implementations, one or more process blocks of FIG. 5 may be performed by another device or a group of devices separate from or including the node, such as one or more other nodes (e.g., one or more other nodes 210), a data storage device (e.g., data storage device 220), a user device (e.g., user device 250), and/or the like.

As shown in FIG. 5, process 500 may include receiving account access information for an account that a user has with an organization, wherein the account access information includes at least one of attempted login information for an attempt to login to the account, login configuration information for a particular attempt to modify login information of the account, or user behavior metadata that describes one or more user interactions with one or more technology resources, that are associated with a system of the organization, during the attempt to login or the attempt to modify the login information of the account (block 510). For example, the node (e.g., using processor 320, memory 330, storage component 340, input component 350, communication interface 370, and/or the like) may receive account access information for an account that a user has with an organization, as described above. In some implementations, the account access information may include at least one of: attempted login information for an attempt to login to the account, login configuration information for a particular attempt to modify login information of the account, or user behavior metadata that describes one or more user interactions with one or more technology resources, that are associated with a system of the organization, during the attempt to login or the particular attempt to modify the login information of the account.

As further shown in FIG. 5, process 500 may include causing a first block to be added to a blockchain that is used for managing access to the account, wherein the first block includes the account access information or an encrypted identifier that identifies a storage location at which the account access information is to be stored (block 520). For example, the node (e.g., using processor 320, memory 330, storage component 340, input component 350, output component 360, communication interface 370, and/or the like) may cause a first block to be added to a blockchain that is used for managing access to the account, as described above. In some implementations, the first block may include the account access information or an encrypted identifier that identifies a storage location at which the account access information is to be stored.

As further shown in FIG. 5, process 500 may include determining a likelihood that the account is being accessed by the user, wherein the likelihood is determined based on an analysis of the account access information and historical account access information for one or more accounts, that include the account, that are used to access services associated with the organization (block 530). For example, the node (e.g., using processor 320, memory 330, storage component 340, and/or the like) may determine a likelihood that the account is being accessed by the user, as described above. In some implementations, the likelihood may be determined based on an analysis of the account access information and historical account access information for one or more accounts, that include the account, that are used to access services associated with the organization.

As further shown in FIG. 5, process 500 may include causing a second block that includes a value representing the likelihood to be added to the blockchain to permit one or more other nodes, that are part of a network with the node, to access the first block and the second block via the blockchain (block 540). For example, the node (e.g., using processor 320, memory 330, storage component 340, input component 350, output component 360, communication interface 370, and/or the like) may cause a second block that includes a value representing the likelihood to be added to the blockchain to permit one or more other nodes, that are part of a network with the node, to access the first block and the second block via the blockchain, as described above.

Process 500 may include additional implementations, such as any single implementation or any combination of implementations described below and/or in connection with one or more other processes described elsewhere herein.

In a first implementation, when receiving the account access information, the node may receive at least a portion of the user behavior metadata from one or more sensor components. In some implementations, at least the portion of the user behavior metadata may include at least one of: keyboard metadata that describes a manner in which an individual interacts with one or more keys of a keyboard, or image data that depicts the individual.

In a second implementation, alone or in combination with the first implementation, the node may generate additional user behavior metadata using one or more sensor elements. In some implementations, the additional user behavior metadata may include at least one of: keyboard metadata that describes a manner in which an individual interacts with one or more keys of a keyboard, or monitor metadata that describes a level of brightness of a monitor.

In a third implementation, alone or in combination with one or more of the first and second implementations, the node may generate user behavior analytics (UBA) information based on the user behavior metadata. In some implementations, when determining the likelihood, the node may determine the value that represents the likelihood based on the analysis of the account access information, the historical account access information, and the UBA information.

In a fourth implementation, alone or in combination with one or more of the first through third implementations, the node, when determining the likelihood, may provide the attempted login information as input to a data model that has been trained using machine learning to cause the data model to output an account security score. In some implementations, the account security score may be based on a comparison of attributes of a password used in the attempt to login and corresponding attributes of a configured password of the account. In some implementations, the account security score may be the value that represents the likelihood that the account is being accessed by the user.

In a fifth implementation, alone or in combination with one or more of the first through fourth implementations, the node may receive, before receiving the account access information, user preferences information for the user. In some implementations, the node may generate, based on the user preferences information, a smart contract for the user that specifies permissible types of account access information that the user has consented to having monitored. In some implementations, the node may cause the smart contract to be stored as a particular record in the blockchain. In some implementations, when determining the likelihood, the node may provide the account access information as input to the smart contract to cause the smart contract to output an account security score based on the permissible types of account access information that the user consented to having monitored. In some implementations, the account security score may be the value that represents the likelihood that the account is being accessed by the user.

In a sixth implementation, alone or in combination with one or more of the first through fifth implementations, the node may receive, after causing the second block to be added to the blockchain, an indication that a particular device has performed an audit of anonymized content that is stored via the blockchain.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for using a distributed ledger to determine a likelihood that a user accessing an account is an authorized user and for performing one or more actions based on the likelihood that the user is the authorized user. In some implementations, one or more process blocks of FIG. 6 may be performed by a node (e.g., node 210, an account security platform, such as account security platform 230, and/or the like). In some implementations, one or more process blocks of FIG. 6 may be performed by another device or a group of devices separate from or including the node, such as one or more other nodes (e.g., one or more other nodes 210), a data storage device (e.g., data storage device 220), a user device (e.g., user device 250), and/or the like.

As shown in FIG. 6, process 600 may include generating account access information for an account that a user has with a system associated with an organization, wherein the account access information includes two or more of attempted login information for an attempt to login to the account, login configuration information for a particular attempt to modify login information of the account, or user behavior metadata that describes one or more user interactions with one or more technology resources, which are associated with the system, during the attempt to login or the attempt to modify the login information of the account (block 610). For example, the node (e.g., using processor 320, memory 330, storage component 340, and/or the like) may generate account access information for an account that a user has with a system associated with an organization, as described above. In some implementations, the account access information may include two or more of: attempted login information for an attempt to login to the account, login configuration information for a particular attempt to modify login information of the account, or user behavior metadata that describes one or more user interactions with one or more technology resources, which are associated with the system, during the attempt to login or the particular attempt to modify the login information of the account.

As further shown in FIG. 6, process 600 may include causing a first record with the account access information to be added to a distributed ledger that is used for managing access to the account (block 620). For example, the node (e.g., using processor 320, memory 330, storage component 340, input component 350, output component 360, communication interface 370, and/or the like) may cause a first record with the account access information to be added to a distributed ledger that is used for managing access to the account, as described above.

As further shown in FIG. 6, process 600 may include obtaining, by referencing the distributed ledger, historical account access information for one or more accounts, that include the account, that are used to access services associated with the organization (block 630). For example, the node (e.g., using processor 320, memory 330, storage component 340, input component 350, output component 360, communication interface 370, and/or the like) may obtain, by referencing the distributed ledger, historical account access information for one or more accounts, that include the account, that are used to access services associated with the organization, as described above.

As further shown in FIG. 6, process 600 may include determining one or more likelihoods that the account is being accessed by the user, wherein the one or more likelihoods are determined based on an analysis of the account access information and the historical account access information (block 640). For example, the node (e.g., using processor 320, memory 330, storage component 340, and/or the like) may determine one or more likelihoods that the account is being accessed by the user, as described above. In some implementations, the one or more likelihoods may be determined based on an analysis of the account access information and the historical account access information.

As further shown in FIG. 6, process 600 may include causing a second record, that includes one or more values that represent the one or more likelihoods, to be added to the distributed ledger (block 650). For example, the node (e.g., using processor 320, memory 330, storage component 340, input component 350, output component 360, communication interface 370, and/or the like) may cause a second record, that includes one or more values that represent the one or more likelihoods, to be added to the distributed ledger, as described above.

As further shown in FIG. 6, process 600 may include causing one or more other nodes, that are part of a network of nodes including the node, to be alerted that the first record and the second record have been added to the distributed ledger (block 660). For example, the node (e.g., using processor 320, memory 330, storage component 340, input component 350, output component 360, communication interface 370, and/or the like) may cause one or more other nodes, that are part of a network of nodes including the node, to be alerted that the first record and the second record have been added to the distributed ledger, as described above.

Process 600 may include additional implementations, such as any single implementation or any combination of implementations described below and/or in connection with one or more other processes described elsewhere herein.

In a first implementation, the distributed ledger may be implemented by a federated blockchain. In a second implementation, alone or in combination with the first implementation, the account access information may further include call center information relating to a call made to modify the login information of the account. In some implementations, when determining the one or more likelihoods, the node may determine one or more account security scores based on the login configuration information, the user behavior metadata, and the call center information. In some implementations, the one or more account security scores may be the one or more values that represent the likelihood that the account is being accessed by the user.

In a third implementation, alone or in combination with one or more of the first and second implementations, the node, when determining the one or more likelihoods, may determine one or more account security scores by providing the attempted login information as input to a smart contract that is stored as a particular record in the distributed ledger, to cause the smart contract to output the one or more account security scores. In some implementations, an account security score, of the one or more account security scores, may be based on a comparison of attributes of a password used in the attempt to login and corresponding attributes of a configured password of the account. In some implementations, an account security score may be a value, of the one or more values, that represents a likelihood, of the one or more likelihoods.

In a fourth implementation, alone or in combination with one or more of the first through third implementations, the node, when determining the one or more likelihoods, may provide the attempted login information and the user behavior metadata as input to a data model that has been trained using machine learning to cause the data model to output an account security score. In some implementations, the account security score may be a value, of the one or more values, that represents a likelihood, of the one or more likelihoods, that the account is being accessed by the user.

In a fifth implementation, alone or in combination with one or more of the first through fourth implementations, records of the distributed ledger may include one or more encrypted identifiers for the historical account access information and the account access information. In some implementations, when obtaining the historical account access information, the node may identify one or more storage locations for the historical account access information based on the one or more encrypted identifiers found in the records of the distributed ledger. In some implementations, the node may obtain the historical account access information from the one or more storage locations.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by a node of a network and based on user preferences information associated with an account that a user has with an organization, a smart contract that specifies permissible types of account access information that the user has consented to having monitored,
        wherein the user preferences information is added to a distributed ledger that is used for managing access to the account, and
        wherein the user preferences information specifies two or more of:
            which account access information of the user is permitted to be monitored,
            when the account access information of the user is permitted to be monitored, or
            how the account access information of the user is permitted to be monitored;
    receiving, by the node of the network, account access information; and
    causing, by the node of the network, a record to be added to the distributed ledger that is used for managing access to the account.

2. The method of claim 1, wherein the account access information is associated with encrypted identifiers.

3. The method of claim 1, wherein the account access information includes one or more of:
    attempted login information,
    login configuration information, or
    user behavior metadata.

4. The method of claim 1, further comprising:
    providing the account access information to one or more other nodes in the network.

5. The method of claim 1, further comprising:
    using the smart contract that is stored by the distributed ledger to determine an account security score.

6. The method of claim 1, wherein the distributed ledger is implemented by a blockchain.

7. The method of claim 1, further comprising:
    causing the smart contract to be stored as another record in the distributed ledger.

8. A node, comprising:
    one or more memories; and
    one or more processors, coupled to the one or more memories, configured to:
        obtain, based on user preferences information associated with an account that a user has with an organization, a smart contract that specifies permissible types of account access information that the user has consented to having monitored,
            wherein the user preferences information is added to a distributed ledger that is used for managing access to the account, and
            wherein the user preferences information specifies two or more of:
                which account access information of the user is permitted to be monitored,
                when the account access information of the user is permitted to be monitored, or
                how the account access information of the user is permitted to be monitored;
        receive account access information; and
        cause a record to be added to the distributed ledger that is used for managing access to the account.

9. The node of claim 8, wherein the account access information is associated with encrypted identifiers.

10. The node of claim 8, wherein the account access information includes one or more of:
    attempted login information,
    login configuration information, or
    user behavior metadata.

11. The node of claim 8, wherein the one or more processors are further configured to:
    provide the account access information to one or more other nodes.

12. The node of claim 8, wherein the one or more processors are further configured to:
    use the smart contract that is stored by the distributed ledger to determine an account security score.

13. The node of claim 8, wherein the distributed ledger is implemented by a blockchain.

14. The node of claim 8, wherein the one or more processors are further configured to:
    cause the smart contract to be stored as another record in the distributed ledger.

15. A non-transitory computer-readable medium storing a set of instructions, the set of instructions comprising:

one or more instructions that, when executed by one or more processors of a node, cause the node to:
obtain, based on user preferences information associated with an account that a user has with an organization, a smart contract that specifies permissible types of account access information that the user has consented to having monitored,
wherein the user preferences information is added to a distributed ledger that is used for managing access to the account, and
wherein the user preferences information specifies two or more of:
which account access information of the user is permitted to be monitored,
when the account access information of the user is permitted to be monitored, or
how the account access information of the user is permitted to be monitored;
receive account access information; and
cause a record to be added to the distributed ledger that is used for managing access to the account.

16. The non-transitory computer-readable medium of claim 15, wherein the account access information is associated with encrypted identifiers.

17. The non-transitory computer-readable medium of claim 15, wherein the one or more instructions further cause the node to:
attempt login information,
login configuration information, or
user behavior metadata.

18. The non-transitory computer-readable medium of claim 15, wherein the one or more instructions further cause the node to:
provide the account access information to one or more other nodes.

19. The non-transitory computer-readable medium of claim 15, wherein the one or more instructions further cause the node to:
use the smart contract that is stored by the distributed ledger to determine an account security score.

20. The non-transitory computer-readable medium of claim 15, wherein the distributed ledger is implemented by a blockchain.

* * * * *